(12) United States Patent
Conen

(10) Patent No.: US 7,726,219 B2
(45) Date of Patent: Jun. 1, 2010

(54) MACHINE TOOL

(76) Inventor: Werner Conen, Wupperstrasse 30, Langenfeld (DE) 40764

( * ) Notice: Subject to any disclaimer, the term of this patent is extended or adjusted under 35 U.S.C. 154(b) by 57 days.

(21) Appl. No.: 12/094,421

(22) PCT Filed: Nov. 16, 2006

(86) PCT No.: PCT/EP2006/011095
§ 371 (c)(1), (2), (4) Date: May 21, 2008

(87) PCT Pub. No.: WO2007/059907
PCT Pub. Date: May 31, 2007

(65) Prior Publication Data
US 2008/0288102 A1    Nov. 20, 2008

(30) Foreign Application Priority Data
Nov. 22, 2005 (DE) .................. 10 2005 055 972

(51) Int. Cl.
*B23B 13/00* (2006.01)
*B23D 1/00* (2006.01)

(52) U.S. Cl. .................................. 82/124; 82/118

(58) Field of Classification Search .................. 82/117, 82/118, 124, 126, 127
See application file for complete search history.

(56) References Cited

U.S. PATENT DOCUMENTS

| 5,309,368 | A | 5/1994 | Chern |
| 6,634,265 | B2 | 10/2003 | Yasuda et al. |
| 2002/0050194 | A1 | 5/2002 | Yasuda et al. |

FOREIGN PATENT DOCUMENTS

| DE | 3133755 | 7/1983 |
| DE | 3329266 | 3/1984 |
| DE | 3420531 | 12/1985 |
| DE | 10140940 | 3/2003 |
| DE | 102004037879 | 3/2005 |
| DE | 102004028206 | 4/2005 |

*Primary Examiner*—Will Fridie, Jr.
(74) *Attorney, Agent, or Firm*—Barlow, Josephs & Holmes, Ltd.

(57) ABSTRACT

The invention is a CNC machine tool, namely a CNC lathe, that includes a horizontal main spindle. The unfinished parts to be machined are supplied to the machine tool horizontally to the working compartment by a handling device integrated into the CNC control, and are then supplied via the handling device to a chuck that is to the horizontal main spindle. The machine tool according to the invention is particularly well-suited for small machining runs.

21 Claims, 8 Drawing Sheets

MACHINE TOOL

BACKGROUND OF THE INVENTION

1. Field of the Invention

The invention relates to a CNC-controlled machine tool, especially a CNC-controlled lathe.

2. Background Art

Today, for loading and unloading machine tools, namely lathes, bar feeds with part catchers are also employed in addition to expensive portal loaders or robots. The portal loader or robot has to be newly adjusted upon each workpiece change. The bar feed is restricted by the passage (bore) and the spindle, and the removal of the finished parts is mostly effected through part catchers which cannot be employed with surface-sensitive workpieces.

From DE 33 29 266 A1, a CNC-controlled machine tool, namely a lathe, with horizontally operating main spindle is known, wherein a linearly movable gripper picks up workpieces from a conveyor and transports them into the processing region and from the processing region again to the conveyor.

DE 101 40 940 A1 describes a CNC-controlled machine tool, namely a lathe, with a vertically operating main spindle, wherein workpieces are conveyed from a conveyor to a liftable delivering device by means of a delivering device, and are transported from there into the processing region and again back to the delivering device and from there to the conveyor by means of a linearly movable main spindle.

From U.S. Pat. No. 6,634,265 B2, a CNC-controlled machine tool, namely a lathe, with horizontally operating main spindle is known, wherein a linearly movable gripper tool unit picks up workpieces from a deposition surface and transports them into the processing region and from there again to the deposition surface.

SUMMARY OF THE INVENTION

The object of the present invention is to provide a machine tool that can still be used even with a small series run.

The invention allows for minimal and low-cost effort to convey workpieces, especially so-called bushing parts, even with smallest series run, into the processing space of a CNC machine tool, preferably a lathe. Here, the functionality of a CNC-controlled machine is included in order to allow a quick, flexible and low-cost solution of loading and unloading. Therein, considering standard components such as tool turrets and part catchers, minimizing the change-over times and the workpiece change times for automating the production is achieved, whereby also loading and unloading for smallest series run becomes cost effective. Thus, for example, with the application of the teaching according to the invention it is possible to change over the loading and unloading device to new dimensions of workpieces to be processed, such as bushing parts, with few manual manipulations within a short period of time, for example one minute.

For fast unloading, the normal workpiece catcher can be simultaneously be used for loading. If the workpieces should be treated gently due to the surface, thus, the reversal of the loading for removing workpieces is possible with low overhead, with finished part pick-up in the turret with little increase of the changeover time.

Therefore, the tool of the present invention can be modified to suit the demands of the customer.

Furthermore, adjustment is no longer needed upon diameter changes. On supply, a small adjustment is required, since here only a prismatic stop that has to be displaced and fixed, for example by means of winged screws. So called pressers formed as guide sheets do not have to be adapted upon diameter change. Gripper fingers are fast to be adjusted by means of adjusting screws. By the large stroke of the gripper especially formed as a pneumatic gripper, readjustment is only required upon a change that is greater than 10 mm.

The gripper in the turret is pre-adjusted by use of a monkey wrench at a manual chuck and actuated by means of spring force.

Additionally, the invention provides that the workpiece gripper is attached to swing arms (swing movements) and is linearly moveable with a slider. By the mechanic coupling of the rotary and linear movements with only one motor, the dynamic flow can be directed from a rotary movement to a linear movement and vice versa without stopping. Thereby, the temporal flow is shortened and the component cost is greatly reduced.

Advantageously, the slider unit can be universally used. The delivery of the workpieces is directed horizontally into the working space and optionally out of this working space. The blanks are fetched vertically from a magazine and horizontally fed to the processing space of the machine tool, namely a lathe.

Optionally, a palette station can be provided. Unloading finished parts is directed to a linear or continuous conveyor, which can be formed as a belt conveyor or palette conveyor.

The workpiece length is automatically detected and evaluated by the torque regulation integrated in the CNC control. Adjustment of the change of workpiece length is not required. This is particularly advantageous in smallest series runs.

If a number of workpieces, which are for example cylindrical on the outer surface, are provided on a supply distance, this series of blanks has to be stopped, separated and fixed at a delivery position for taking measurements, thereby providing isolation. The invention provides that this is only effected by linear movement, for example by means of a cylinder driven by pressure medium pressure, preferably pneumatic in nature, which is for example to be loaded alternatively on both sides by pressure namely pneumatic in nature. Herein, the assembly of the isolation is chosen such that adjustment is not required upon change of the diameter. The stroke pressure to the workpiece gripper is chosen such that all of the workpiece lengths of the specification of the loading device proceeds automatically without setup and adjustment. Thereby, quick change-over to new workpiece sizes is possible, and use of this loading means is also economical with the capability of small lot sizes.

BRIEF DESCRIPTION OF THE DRAWINGS

The invention's preferred embodiments, together with further objects and attendant advantages, will be best understood by reference to the following description taken in connection with the following drawings in which.

DETAILED DESCRIPTION OF THE INVENTION

Figure 1:
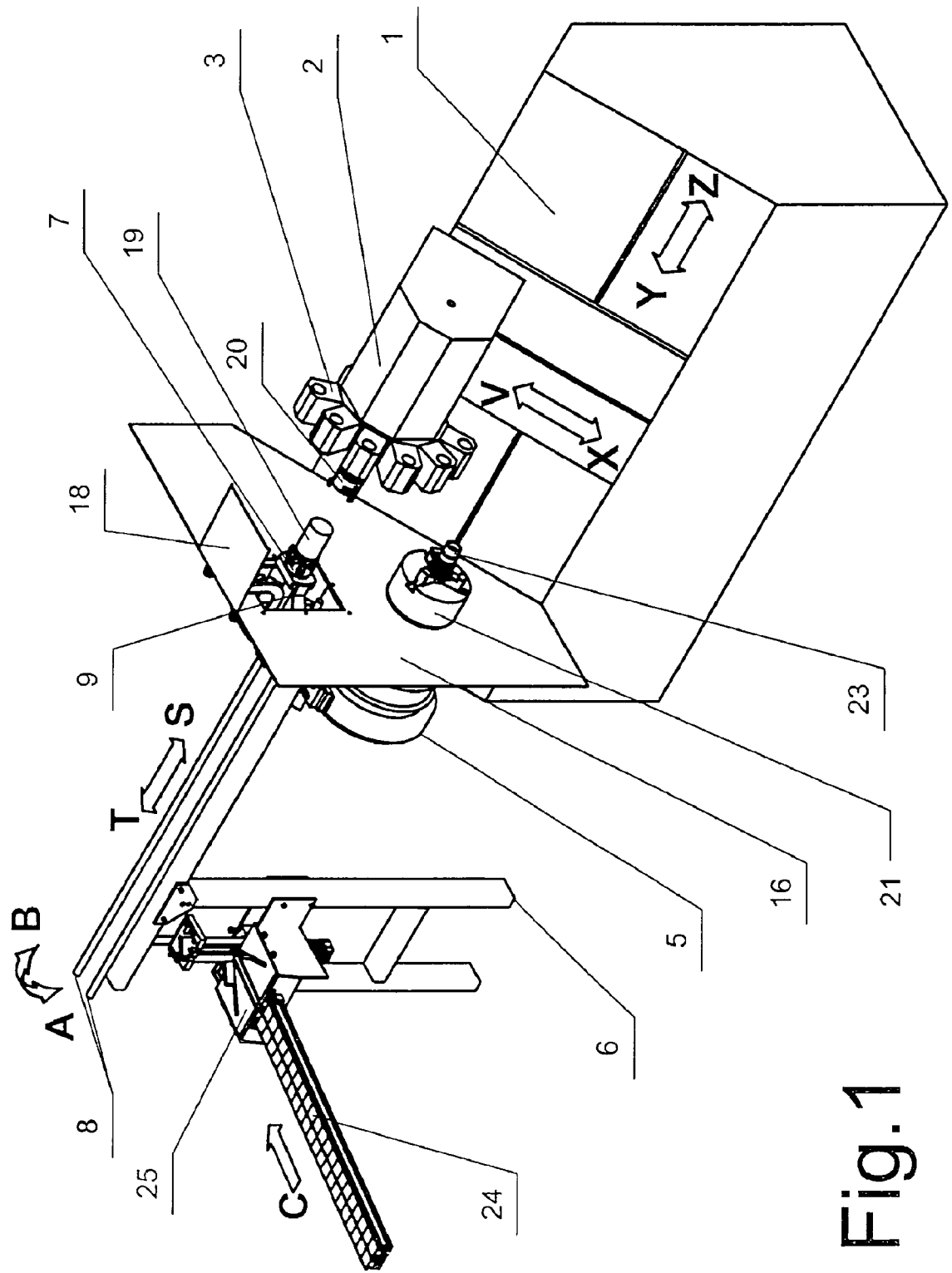
FIG. 1 is a front perspective view of a machine tool formed as a CNC-controlled lathe wherein the handling device is in the delivery position in the processing space.
Figure 2:
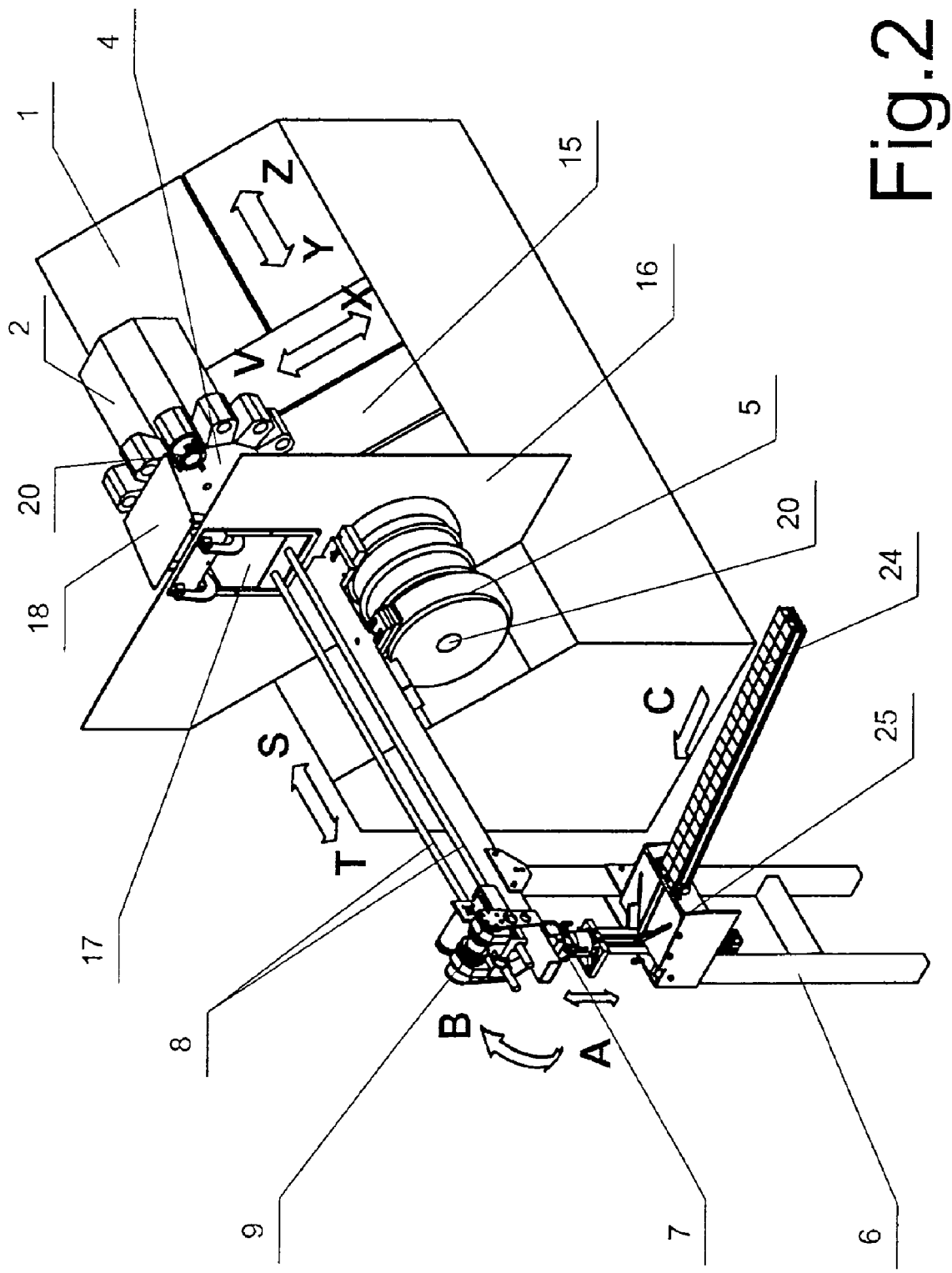
FIG. 2 is a rear perspective view of the lathe of FIG. 1 wherein the handling device is in the take-over position at the magazine.

Referring first to FIGS. 1 and 2, the invention has particular application in a CNC-controlled lathe, which is substantially composed of a bench 1 and a slider unit 2, which is movable in a direction Y or Z and X or V by a motor, respectively with a turret 3 that is CNC-controlled and driven by a motor, which includes a turret disc 4.

The reference character 5 denotes a spindle box, while 6 represents a rack above which a gripper 7 formed as a pneumatic gripper is disposed. The gripper 7 is liftable by a motor in opposite directions T and S, respectively, on two guide bars 8 with their longitudinal axes parallel to each other and extending horizontally. For this purpose, a rotating and linear unit 9 is associated with the gripper 7, which substantially has planetary gearing 10, a drive motor 11 for example formed as a direct-current motor, a toothed belt pulley 12, a rotating unit 13, and a transverse beam 14 for disposing the gripper 7. Through the drive motor 11 and the planetary gearing 12 and toothed belt (not shown), the rotating and linear unit 9 can be driven by a motor in the longitudinal axis direction of the guide bars 8, thus in the direction T and S, respectively, on the one hand, but the rotating unit 13 can also be swung in vertical plane, thus in the direction A and B, respectively, by more than 180°, preferably by an angle of 270°, according to which part is fixedly braked, on the other hand. For the lifting movement in T and S, respectively, for example, the toothed belt (not shown) is guided over the toothed belt pulley 12, which can be fixedly braked (be fixed), or the toothed belt pulley 12 is fixedly braked, thereby effecting a swing movement of the rotating unit 13 with the gripper 7 about the longitudinal axis of the planetary gearing 10 or the toothed belt pulley 12, respectively. In this manner, workpieces to be processed can be picked up and transported or processed workpieces can also be deposited again, if needed, respectively, in the manner described below.

The lathe, as in the drawings, has a working space 15, which can be encapsulated to the outside (not shown). Only a partition 16 can be seen in the drawing, which has an opening 17, which is closable by a flap 18 swingably movable about a horizontal axis. The guide bars 8 are supported in the opening 17 such that the gripper 7 can transport gripped workpieces 19 through the opening 17 into the working space 15 and deliver them to a gripper 20 for example formed as a spring gripper, which delivers the picked-up workpiece 19 to the chuck 21 of a main spindle by a corresponding rotating movement and a displacement movement in the direction Y. The finished part is designated by the reference character 23. The main spindle is designated by 20.

Figure 3:
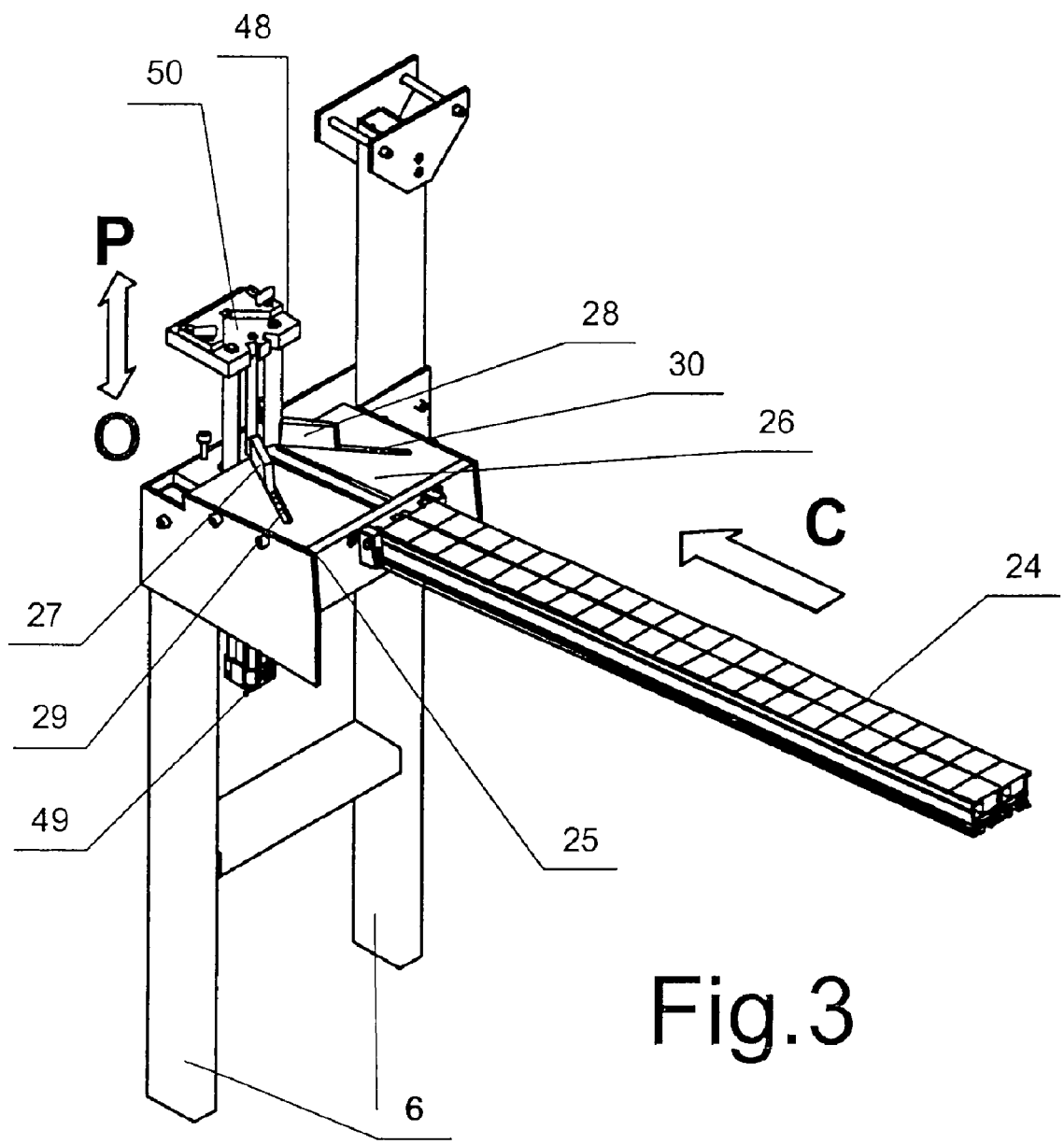
FIG. 3 is a close-up perspective view of the machine tool of FIG. 1 and FIG. 2.
Figure 4:
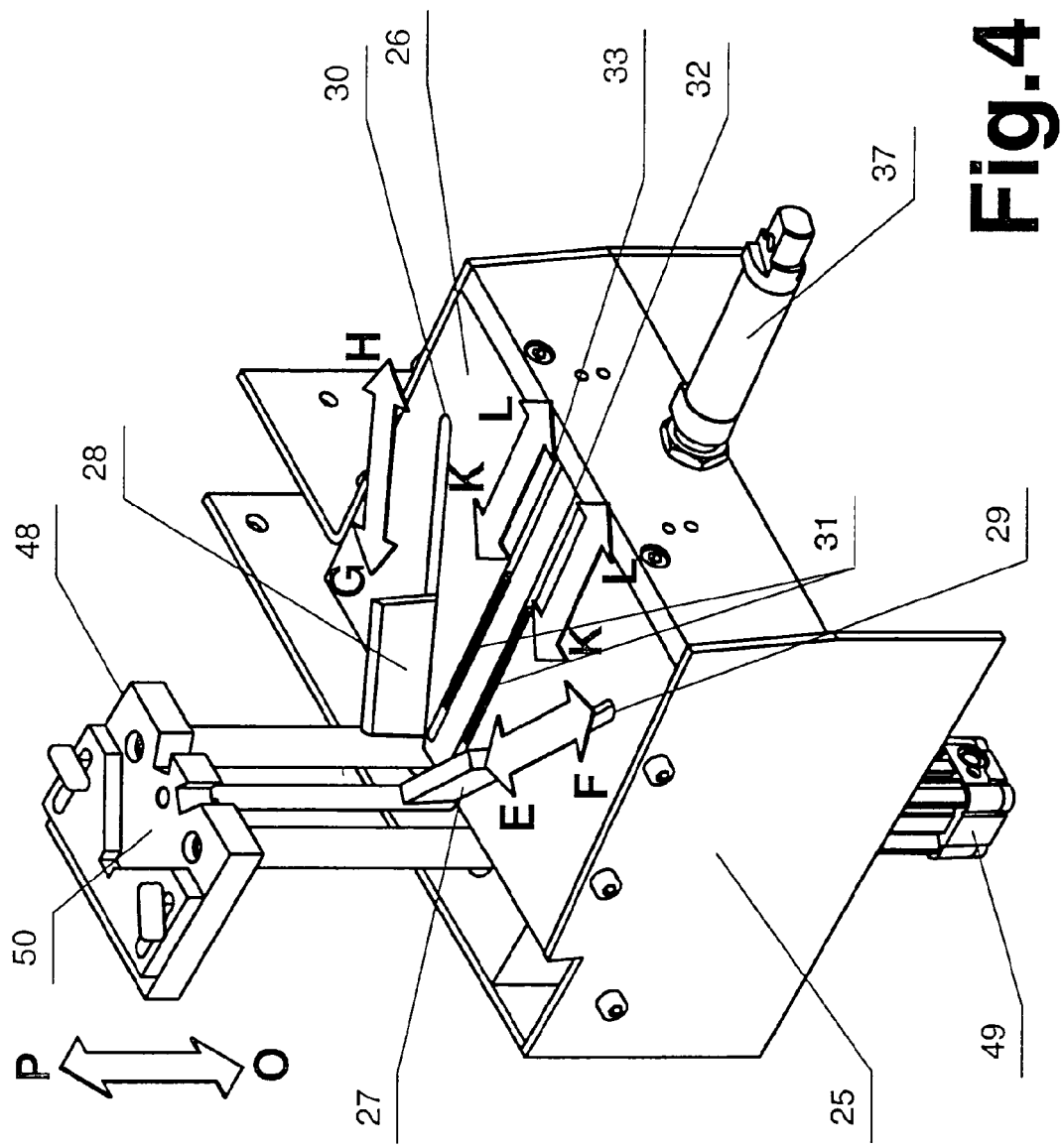
FIG. 4 is a close-up perspective view of the slide table and the prism.
Figure 5:
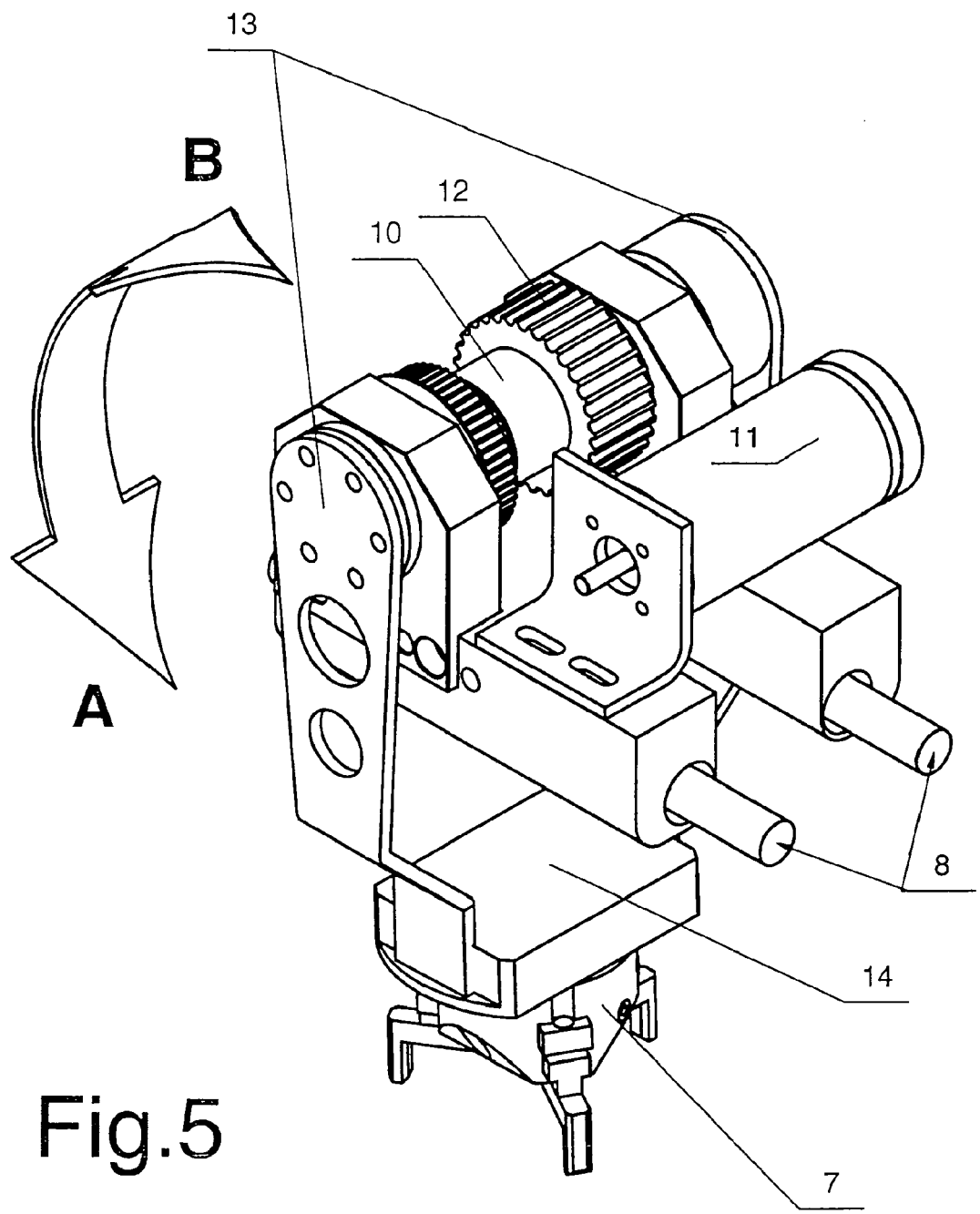
FIG. 5 is a perspective view of a swing and rotating unit formed as a rotating and linear unit with the gripper swung downwards.
Figure 6:
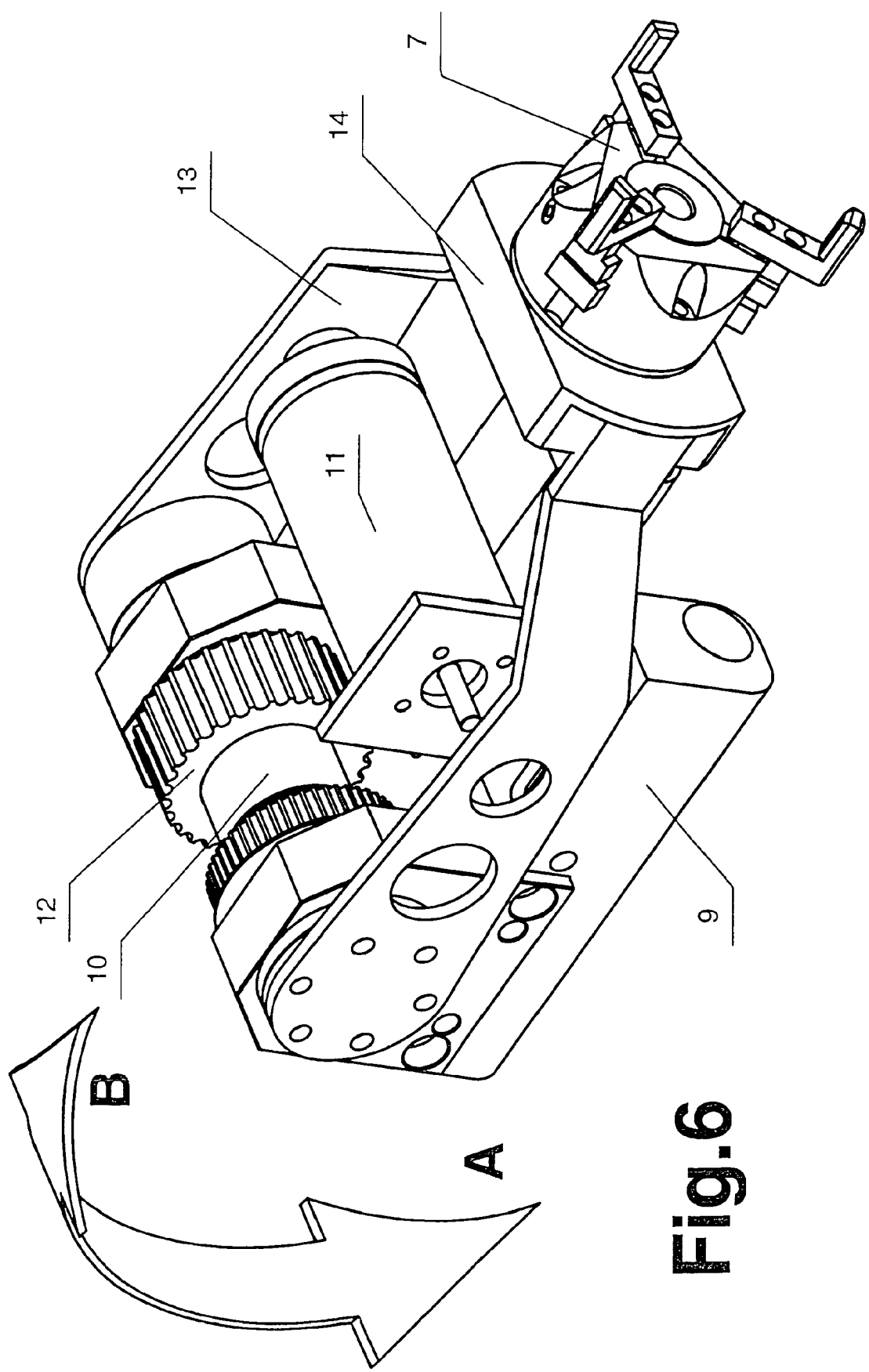
FIG. 6 is a perspective view of the rotating and linear unit of FIG. 5 with the gripper swung in horizontal plane.
Figure 7:
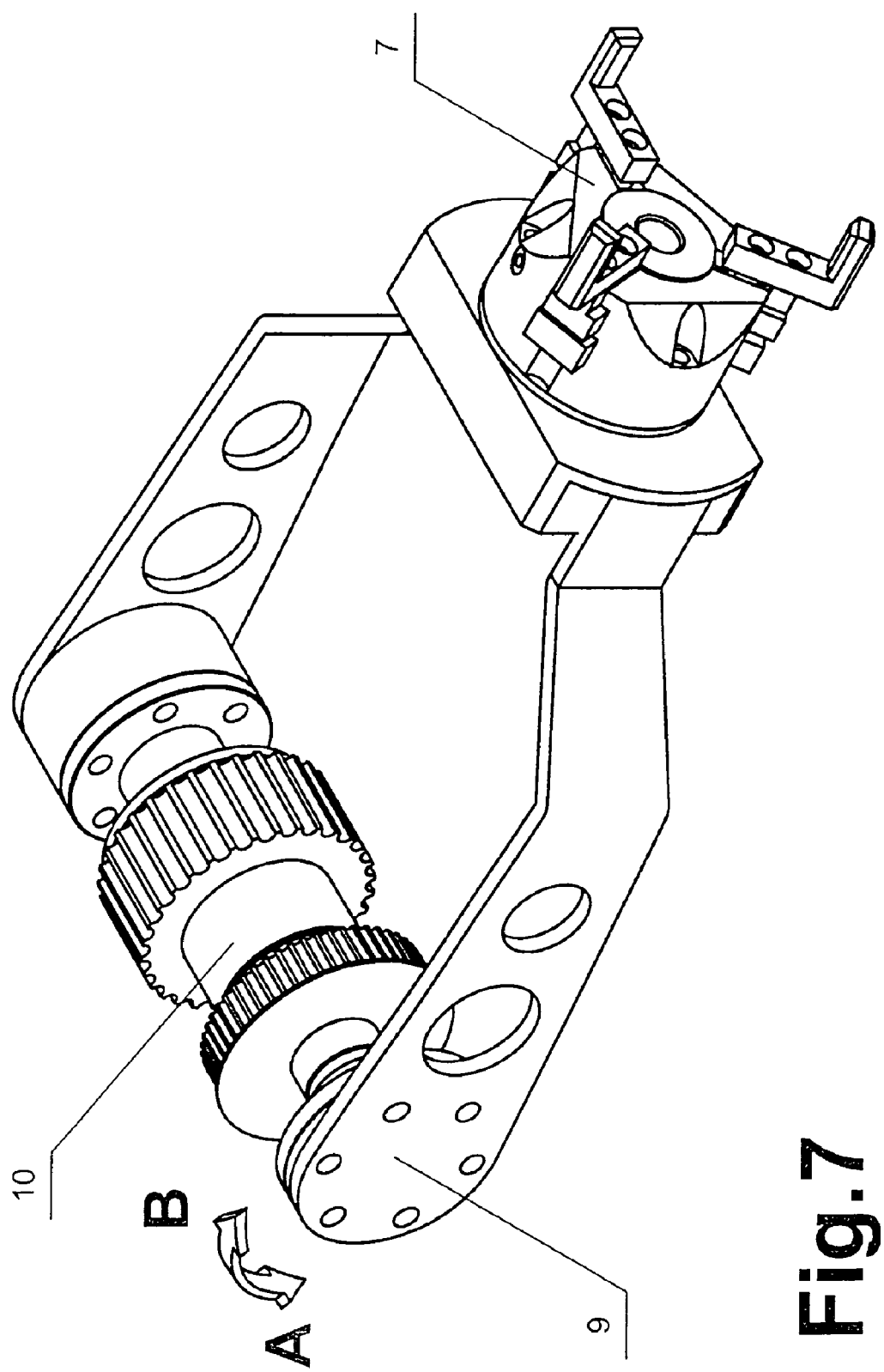
FIG. 7 is a perspective view of a cutout representation of the rotating and swing unit according to FIGS. 5 and 6.
Figure 8:
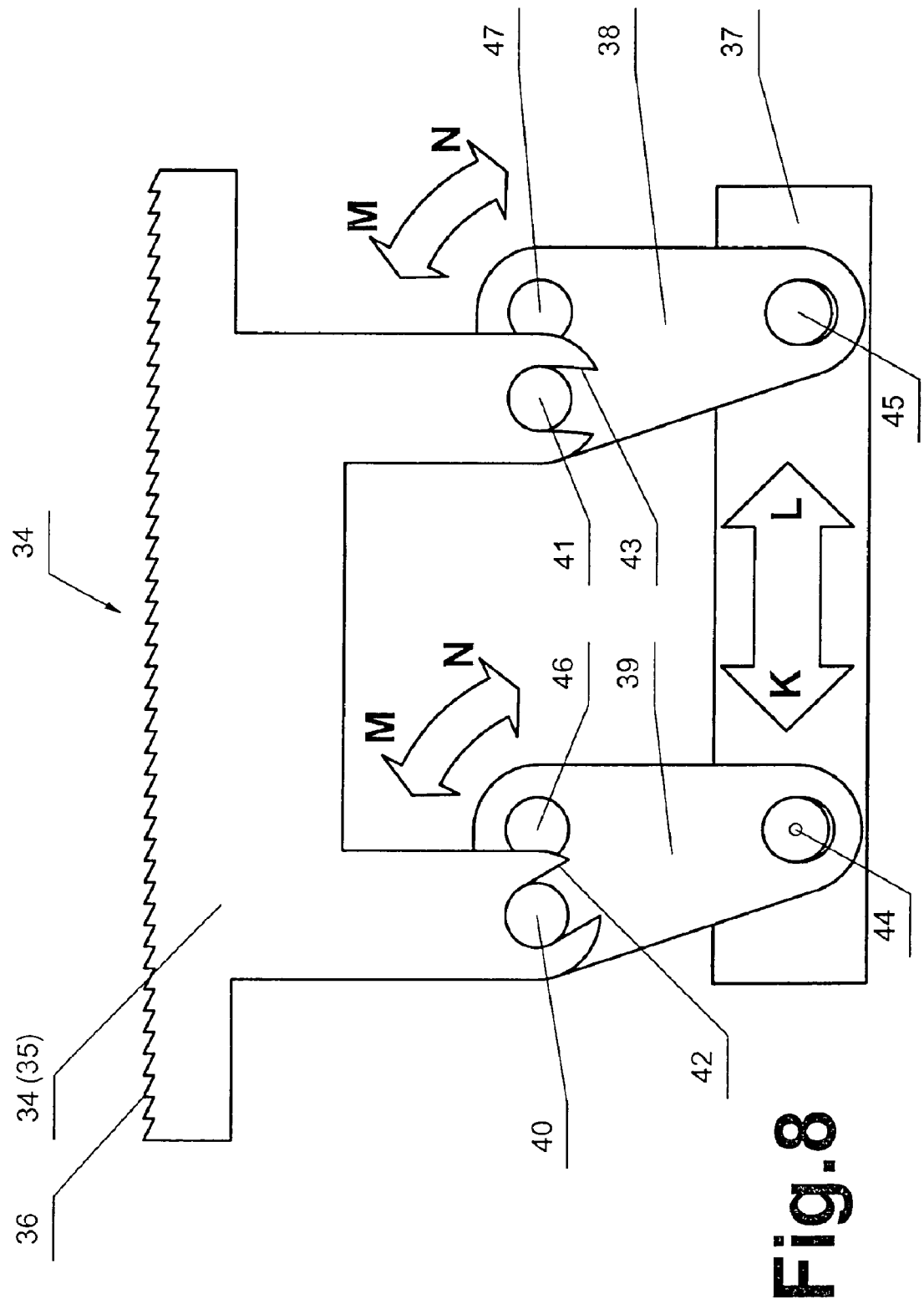
FIG. 8 is a side elevational view of the transporter of FIG. 1 and FIG. 2.

As can be seen in FIGS. 3 and 4, the linear conveyor for example formed as a roller conveyor, which is driven by a motor or by gravity (e.g. chute), is designated by the reference character 24, by which the workpieces 19 to be processed (blanks) are conveyed. By the linear conveyor 24, the blanks 19 are fed to a supply device 25 described below in the direction C. At the end of the linear conveyor 24, a slide table 26 with horizontal supporting plate is provided, which has two plate- or sheet-shaped pressers 27, 28 diverging from each other in an angle α of 60° with the longitudinal axes in the illustrated embodiment, which are each disposed continuously slidable in the direction E, F or G, H, respectively, by a motor in longitudinal slots 29, 30 of the slide table 26, which are formed longer than these pressers 27, 28. The supply device 25 has a one-piece box-shaped formation, below the slide table 26 of which a transporter 31 is disposed liftable/swingable in the direction K and L, respectively. The transporter 31 is substantially composed of tongue-shaped transport tongues 34, 35, which are disposed in longitudinal slots 32 and 33, respectively, parallel and spaced from each other, roughened on its surface areas each protruding from the longitudinal slots 32 and 33 or provided with toothing or corrugation 36. The two transport tongues 34 and 35 and the pressure plates 27, 28 are driven in opposite directions by a lifting motor 37. This lifting motor 37 can be formed by a piston-cylinder unit to be loaded by medium pressure, especially alternatively on both sides by pressurized air. At 38 and 39, as can be seen in FIG. 8, two spaced, identical levers are disposed provided in pairs for each transport tongue 34 and 35. The lever pairs 38 and 39 and the lever pairs of the other transport tongue 34 or 35, respectively, are each drivable by a coulisse consisting of a continuous bolt 40 and 41 extending transversely to the lifting direction K-L and slot-shaped elongated holes 42 and 43, respectively, disposed in projections provided at the ends of the transport tongues 34 and 35, in which the bolts 40 and 41, respectively, migrate, if a lifting displacement in the direction K or L, respectively, is effected. Therein, the levers 38 and 39, respectively, swing about the axes 44 and 45, respectively, which are associated with the lifting motor 37, on the one hand, and about fixed axes 46 and 47, respectively, associated with the slide table 36, whereby the transport tongues 34 and 35 carry out a lifting displacement movement in the direction M or N, as in FIG. 8, respectively, and thereby lift blanks 19 situated on the slide table 26 and prevent them from a further forward movement in the direction C towards the pressers 27 and 28, respectively, or advance them between these diverging pressure plates 27 and 28. The axes 44, 45 are supported in elongated holes. Thereby, this part has three functions, namely a transport of the blanks 19, an isolation action and positioning with respect to the pressure plates 27 and 28, and a prism-like part 48, which is movable in the direction O and P, respectively, by a lifting motor 49 to be loaded alternatively on both sides by medium pressure, such as by air pressure. The prism-like part 48 has corresponding to the angle that the pressure plates 27 and 28 form with their side wells facing each other, a corresponding recess 50, into which the workpieces 19 to be processed are inserted upon lowering the prism 48. They are then lifted off the slide table 26, whereupon they are gripped by the gripper 7 swung downwards in the direction A and then swung upwards by 270° and subsequently transported in the direction S to the working space 15 of the lathe, where they are delivered to the spring gripper 20, which delivers them in turn to the chuck 21 of the main spindle for processing. The movements of the pressure plates 27 and 28 are thus such that they press the blanks tangentially against the prism-like member 48, while the longitudinal/lifting movement of the transport tongues 34, 35 of the transporter 31 is effected similarly to a sewing machine. Therein, the lifting stroke (e.g. tipping) over the lever mechanism 38, 39, 40, 41 (FIG. 8) of the transporter 31 is achieved such that the transport tongues 34, 35 are lifted upon forward movement and are lowered upon rearward stroke. All of the drives as well as all of the lifting and swing movements can be included in a sequence control, such as in the CNC control of the lathe.

The torque monitoring allows the selection and starting of different NC processing programs, respectively, after determining the part length. Thus, an automatic production of part families is possible. Tolerances can be defined for the workpiece lengths in order to ensure rejection/deposition without processing. Thereby, increase of the production safety results.

Horizontal supply of the blanks 19 into the working space 15 of the lathe is provided. After complete processing, the chuck 21 is released such that the finished parts 23 drop or slide into a provided container via a chute or the like. They can be transported away in any other manner (not shown). However, with surface-intensive parts it is possible to take the gripper 20 of the turret 3 for transporting off the completely processed workpieces 23, thus in turn delivering them to the gripper 7, which then transports the completely processed workpieces 23 in the direction T and conveys them in appropriate manner to the same member 24 or another conveyer. This can occur by a linear or swing movement. It is possible to linearly move the rotary and linear unit 9 in the vertical position with gripper 7 directed downwards in the direction S to deliver the finished part there to a conveyer disposed next to the feed 24. It is also possible to associate a further axis, for example a transverse axis, with the gripper 7 in order that the finished parts 23 can be conveyed on a parallel conveyor or in another manner to a conveyer disposed in an angle to the linear conveyer 24. The supply of blanks 19 on the one hand and the removal of finished parts 23 on the other hand are then fully-automatically achieved.

The features described in the summary, in the claims and in the description as well as apparent from the drawing can be essential for the realization of the invention both individually and in any combinations.

The invention claimed is:

1. A CNC-controlled machine tool, comprising:
   a horizontally disposed main spindle with chuck, for receiving unprocessed workpieces to be processed;
   a first handling device disposed proximal to the main spindle and integrated in the CNC control; said first handling device being configured and arranged for picking up and delivering unprocessed workpieces to the chuck of the main spindle, rotatable about a spindle axis, and for removing processed workpieces; the chuck being located within a working space for processing workpieces;
   a first linear conveyor horizontally disposed parallel to the main spindle and outside of the working space;
   second handling device, driven by a motor and longitudinally reciprocatable along the first linear conveyor;
   a gripper connected to the second handling device;
   a second linear conveyor, driven by a motor, having an end; unprocessed workpieces being transportable on the second linear conveyor toward the second handling device; the second handling device with gripper being longitudinally reciprocatable along the first linear conveyor over the second linear conveyor; the second handling device sequentially removing unprocessed workpieces from the second linear conveyor to a working space for processing of the unprocessed workpieces;
   pressure plates, disposed divergently relative to each other, being located proximal to the end of the second linear conveyor; said pressure plates being configured and arranged to isolate an approaching unprocessed workpiece received from the second conveyor and to align the unprocessed workpiece in preparation for pick up by the gripper of the handling device and subsequent transport to the working space for processing; said pressure plates being actuatable in a longitudinal direction to assist in pressing up the unprocessed workpiece into a delivery position suitable for receipt by the gripper and subsequent transport by the handling device.

2. A CNC-controlled machine tool, comprising:
   a horizontally disposed main spindle with a chuck for receiving unprocessed workpieces to be processed; the main spindle and chuck located in a working space for processing workpieces;
   a first handling device disposed in spaced apart relation from the main spindle, longitudinally reciprocatable and integrated in the CNC control for picking up and delivering unprocessed workpieces to the chuck of the main spindle in the working space; the first handling device being capable of removing processed workpieces from the working space;
   a first linear conveyor horizontally disposed parallel to the main spindle and outside of the workspace and driven by a motor;
   a second handling device having a gripper connected thereto; said second handling device being reciprocatable by the first linear conveyor;
   a second linear conveyor providing a supply of unprocessed workpieces; the second handling device with gripper being longitudinally reciprocatable between an unprocessed workpiece pick-up location over the second linear conveyor and the working space; the second handling device being capable of sequentially picking up unprocessed workpieces and transporting them to the working space for processing; and
   the CNC control being configured and arranged to include integrated torque regulation therein for the handling device in the working space; means for automatically measuring the dimensions of unprocessed workpieces received by the handling device within preset tolerances.

3. The machine tool according to claim 1, wherein the pressure plates are disposed at an angle relative to each other that is less than 90 degrees.

4. The machine tool according to claim 1, further comprising:
   a slide table defining a plurality of slots corresponding to the pressure plates; the pressure plates, by a motor, being reciprocatable and liftable in a longitudinal direction in their respective slots; said pressure plates being lockable in place.

5. The machine tool according to claim 1, wherein the pressure plates include side walls that tangentially contact side walls, at a contact point, of an unprocessed workpiece; an orthogonal line to a tangent at the contact point passing through a center point of the workpiece; receipt of an unprocessed workpiece between the pressure plates thereby being independent of diameter variation of unprocessed workpieces.

6. The machine tool according to claim 1, further comprising:
   a slide table; the pressure plates cooperating with the slide table to deliver unprocessed workpieces; the slide table including a means for lifting unprocessed workpieces to a prism member; unprocessed workpieces located between the pressure plates being capable of detected and lifted up to the gripper of the second handling device for further transport.

7. The machine tool according to claim 1, further comprising:
   at least one horizontal rigid guide having a longitudinal axis extending parallel to the main spindle and outside of the working space; the second handling device and gripper being actuatable along the rigid guide by a motor along a longitudinal axis; the second handling device being rotatably swingable; the motor drive of the second handling device being controlled in position.

8. A machine tool according to claim 1, further comprising:
a partition defining a closable aperture therethrough; the partition being disposed between the working space and the unprocessed workpiece pick-up location; the gripper attached to the second handling device being routable through the aperture into the working space.

9. The machine tool according to claim 1, characterized in that the first handling device disposed in the working space is of a multi-turret configuration and drivable by a motor about an axis disposed parallel to the spindle axis; said motor drive being integrated into the CNC control.

10. The machine tool according to claim 1, wherein the second handling device is actuatable in a linear direction along the first linear conveyor and drivable by the same motor; the second handling device being rotatable by more than 180 degrees.

11. The machine tool according to claim 2, wherein the first handling device is a turret that is liftable parallel to the main spindle and is movable with a reduced torque into a delivery position; means for detecting and evaluating length of the workpiece to be processed with preset tolerances after reaching a predetermined torque; a workpiece to be processed being deliverable to the chuck upon measurement results outside of these tolerances for processing; a CNC processing program being selectable and startable according to workpiece length.

12. The machine tool according to claim 6, characterized in that the prism member is removably secured by screws.

13. The machine tool according to claim 6, further comprising:
transport tongues located underneath the slide table;
lifting movement of the pressure plates and the transport tongues is effectuated at the same time thereby transporting workpieces to be processed by a longitudinal stroke.

14. The machine tool according to claim 6, further comprising:
means for monitoring the respective locations of the pressure plates, the prism member and the grippers to effectuate detection of missing workpieces to be processed;
means for creating an alarm message to indicate that a workpiece to be processed is missing.

15. The machine tool according to claim 13, wherein the transport tongues include an upper surface that is roughened to increase frictional communication with workpieces to be processed for improved transport thereof.

16. The machine tool according to claim 13, further comprising:
a drive for the transport tongues including a coulisse guide, parallelogram lever drive with a lifting motor disposed below the slide table; the transport tongues being driven in a liftable/swingable manner thereby.

17. The machine tool according to claim 16, wherein transport tongues each further include:
a lifting motor;
two levers pivotally connected to the lifting motor plate at first ends in spaced apart relation to each other; bolts respectively connected to second free ends of the two levers;
two legs in spaced apart relation to each other and downwardly depending from each respective transport tongue; each leg have a free end defining a longitudinal slot disposed at respective free ends thereof; the bolts of the two levers respectively residing in the longitudinal slots; and
whereby lifting movement of the transport tongues is effectuated upon lateral actuation of the lifting motor.

18. The machine tool according to claim 16, wherein movement of the pressure plates and the transport tongues are synchronized with each other and are driven by movement of the same lifting motor.

19. The machine tool according to claim 6, wherein the second linear conveyor transports the workpieces to be processed onto the slide table and below a swing path of the second handling device.

20. The machine tool according to claim 16, wherein the slide table is a top planar member of a box-shaped supply device; the slide table defining slots for receiving the pressure plates and transport tongues therethrough; the lifting motor, for driving the transport tongues and the pressure plates, residing in the box-shaped supply device.

21. The machine tool according to claim 16, wherein the prism member with a lifting motor is disposed on a side of the slide table that faces away from the second linear conveyor.

* * * * *